(12) United States Patent
Takada et al.

(10) Patent No.: US 11,024,837 B2
(45) Date of Patent: Jun. 1, 2021

(54) NONAQUEOUS ELECTROLYTE SECONDARY BATTERY

(71) Applicant: Panasonic Intellectual Property Management Co., Ltd., Osaka (JP)

(72) Inventors: Akihiko Takada, Hyogo (JP); Sho Urata, Hyogo (JP); Kouhei Tuduki, Hyogo (JP); Fumiharu Niina, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 16/321,900

(22) PCT Filed: Jul. 28, 2017

(86) PCT No.: PCT/JP2017/027424
§ 371 (c)(1),
(2) Date: Jan. 30, 2019

(87) PCT Pub. No.: WO2018/030176
PCT Pub. Date: Feb. 15, 2018

(65) Prior Publication Data
US 2019/0181423 A1    Jun. 13, 2019

(30) Foreign Application Priority Data
Aug. 9, 2016    (JP) .............................. JP2016-156424

(51) Int. Cl.
*H01M 4/131*    (2010.01)
*H01M 4/133*    (2010.01)
(Continued)

(52) U.S. Cl.
CPC ........... *H01M 4/131* (2013.01); *H01M 4/133* (2013.01); *H01M 4/1391* (2013.01);
(Continued)

(58) Field of Classification Search
CPC .... H01M 4/131; H01M 3/133; H01M 4/1393; H01M 4/36; H01M 10/0525
See application file for complete search history.

(56) References Cited

U.S. PATENT DOCUMENTS

2011/0206977 A1    8/2011    Ikeda
2011/0274982 A1*  11/2011    Kaneko ............. H01M 10/0587
                                                                429/303
(Continued)

FOREIGN PATENT DOCUMENTS

JP    2008-153117 A    7/2008
JP    4524713 B2    8/2010
(Continued)

OTHER PUBLICATIONS

International Search Report dated Oct. 31, 2017, issued in counterpart application No. PCT/JP2017/027424 (2 pages).

*Primary Examiner* — Kenneth J Douyette
(74) *Attorney, Agent, or Firm* — Westerman, Hattori, Daniels & Adrian, LLP

(57) ABSTRACT

A nonaqueous electrolyte secondary battery according to an embodiment includes an electrode body, which is formed by winding a positive electrode and a negative electrode through a separator and then compressing into a flat shape, and a nonaqueous electrolyte. The positive electrode contains a lithium transition metal oxide which contains tungsten oxide adhering to the particle surfaces thereof. The negative electrode contains a negative electrode active material, which has particle surfaces coated with an amorphous carbon film, and at least one of polyacrylic acid and a salt thereof. The pressure acting in the thickness direction of the electrode body is $5 \times 10^{-2}$ MPa or more.

3 Claims, 3 Drawing Sheets

(51) Int. Cl.
*H01M 4/1393* (2010.01)
*H01M 4/36* (2006.01)
*H01M 10/0525* (2010.01)
*H01M 10/0587* (2010.01)
*H01M 4/587* (2010.01)
*H01M 4/62* (2006.01)
*H01M 4/1391* (2010.01)

(52) U.S. Cl.
CPC ......... *H01M 4/1393* (2013.01); *H01M 4/366* (2013.01); *H01M 4/587* (2013.01); *H01M 4/62* (2013.01); *H01M 10/0525* (2013.01); *H01M 10/0587* (2013.01)

(56) References Cited

U.S. PATENT DOCUMENTS

| | | | |
|---|---|---|---|
| 2014/0193691 A1* | 7/2014 | Ueki | H01M 2/1686 429/144 |
| 2015/0056387 A1* | 2/2015 | Dadheech | H01M 4/1397 427/596 |
| 2017/0256801 A1 | 9/2017 | Sugimori et al. | |

FOREIGN PATENT DOCUMENTS

| | | |
|---|---|---|
| JP | 4672985 B2 | 4/2011 |
| JP | 2012-142228 A | 7/2012 |
| WO | 2016/047031 A1 | 3/2016 |
| WO | 2016/084357 A1 | 6/2016 |
| WO | 2016/098708 A1 | 6/2016 |
| WO | 2016/136211 A1 | 9/2016 |
| WO | 2016/157735 A1 | 10/2016 |
| WO | 2017/056448 A1 | 4/2017 |

* cited by examiner

NONAQUEOUS ELECTROLYTE SECONDARY BATTERY

TECHNICAL FIELD

The present invention relates to a nonaqueous electrolyte secondary battery.

BACKGROUND ART

Patent Literature 1 discloses a nonaqueous electrolyte secondary battery including a negative electrode which contains a negative electrode active material containing a Li—Si alloy, and contains a binder containing non-cross-linked type polyacrylic acid. Patent Literature 2 discloses a nonaqueous electrolyte secondary battery including a porous insulating layer formed by filling and molding insulating particles composed of a metal oxide on the separator-side surface of at least one of a positive electrode and a negative electrode. Patent Literatures 1 and 2 describe the effect of improving the cycling characteristics of the batteries.

CITATION LIST

Patent Literature

PTL 1: Japanese Patent No. 4672985
PTL 2: Japanese Patent No. 4524713

SUMMARY OF INVENTION

However, the nonaqueous electrolyte secondary batteries of Patent Literatures 1 and 2 are capable of suppressing, to some extent, deterioration in cycling characteristics but are incapable of improving regeneration characteristics at low temperature.

In an aspect of the present disclosure, a nonaqueous electrolyte secondary battery is a nonaqueous electrolyte secondary battery including an electrode body, which is formed by laminating a positive electrode and a negative electrode through a separator, and a nonaqueous electrolyte, and the positive electrode contains a positive electrode active material including a lithium transition metal oxide which contains tungsten oxide adhering to the particle surfaces thereof. The negative electrode contains a negative electrode active material, which includes amorphous carbon, and at least one of polyacrylic acid and a salt thereof. The pressure acting in the thickness direction of the electrode body is $5 \times 10^{-2}$ MPa or more.

In an aspect of the present disclosure, a nonaqueous electrolyte secondary battery can exhibit excellent generation characteristic even at low temperature.

DESCRIPTION OF EMBODIMENTS

As described above, improving low-temperature regeneration is an important problem for a nonaqueous electrolyte secondary battery. As a result of earnest investigation for solving the problem, the inventors of the present invention found that when the battery contains a positive electrode active material including a lithium transition metal oxide to which tungsten oxide adheres, a negative electrode active material containing amorphous carbon, and at least one of polyacrylic acid and a salt thereof as a binder of a negative electrode, and when the pressure (constituent pressure) acting in the thickness direction of an electrode body is $5 \times 10^{-2}$ MPa or more, low-temperature regeneration is specifically improved.

Polyacrylic acid and a salt thereof (PAA) adhere to the particle surfaces of the negative electrode active material and strongly bond together the particles of the active material, thereby contributing to improvement in cycling characteristics. On the other hand, PAA does not allow lithium ions to permeate therethrough and thus decreases low-temperature regeneration. A nonaqueous electrolyte secondary battery according to the present disclosure uses a negative electrode active material including amorphous carbon and uses PAA strongly adhered to the amorphous carbon by applying a constituent pressure of $5 \times 10^{-2}$ MPa or more. In addition, a film due to W of tungsten oxide adhering to the particle surfaces of lithium transition metal oxide is formed in a PAA structure. It is supposed that a W-containing film with low resistance, which is compounded with PAA, is formed on the surface of the amorphous carbon, and the low-temperature regeneration is considered to be improved by the film with low resistance. Without the amorphous carbon, the resistance of the film is increased, while with the low constituent pressure, adhesion between the amorphous carbon and PAA is decreased. In either of both cases, the film contributing to improvement in low-temperature regeneration is considered to be not formed.

An embodiment of the present disclosure is described in detail below with reference to the drawings. The drawings referred to in the embodiment are schematically shown, and thus the specific dimensions etc. of each component should be determined in consideration of the description below.

A nonaqueous electrolyte secondary battery 10 described below as an example is a laminated battery including an outer package composed of a laminate film. The nonaqueous electrolyte secondary battery 10 is an example of the embodiment, and the nonaqueous electrolyte secondary battery according to the present disclosure may be a battery with another form, for example, a prismatic battery.

Figure 1:
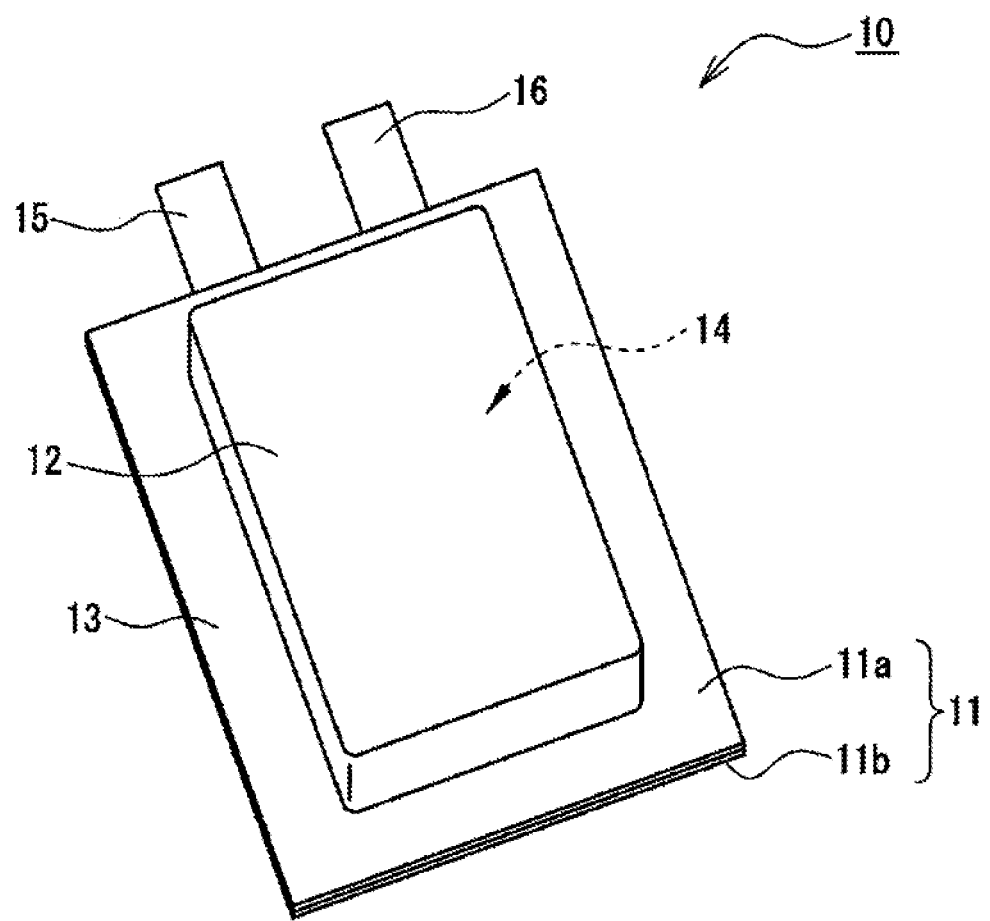
FIG. 1 is a perspective view of a nonaqueous electrolyte secondary battery as an example of an embodiment.

FIG. 1 is a perspective view of the nonaqueous electrolyte secondary battery 10 as an example of the embodiment. As illustrated in FIG. 1, the nonaqueous electrolyte secondary battery 10 includes an outer package 11 composed of two laminate films 11a and 11b. The nonaqueous electrolyte secondary battery 10 includes an electrode body 14 and a nonaqueous electrolyte, which are housed in a housing part 12 of the outer package 11. Although described in detail later, the electrode body 14 housed in the outer package 11 has been pressed in the thickness direction by using a pressing member 17 (not shown in FIG. 1) illustrated in FIG. 3. The nonaqueous electrolyte secondary battery 10 is provided with the pressing member 17 which applies pressure P to the electrode body 14 from the outside of the outer package 11.

The outer package 11 has, for example, a substantially rectangular shape in a plan view. The outer package 11 has a sealing part 13 formed by bonding the laminate films 11a and 11b to each other, thereby closing the housing part 12 (inner space of the outer package 11) which houses the electrode body 14. The sealing part 13 is formed in a frame shape having the same width along the edge of the outer package 11. A portion with a substantially rectangular shape in a plan view surrounded by the sealing part 13 is the housing part 12. The housing part 12 can be provided by forming a recess, which can house the electrode body 14, in at least one of the laminate films 11a and 11b. In the embodiment, the recess is formed in each of the laminate films.

A film having resin layers formed on both surfaces of a metal layer is preferably used as the laminate films 11a and 11b. One of the resin layers is preferably composed of a resin which can be thermocompression-bonded. The metal layer is, for example, an aluminum thin film layer and has the function of preventing permeation of moisture and the like. A preferred example of the laminate films is an aluminum laminate film.

The nonaqueous electrolyte secondary battery 10 includes a pair of electrode leads (a positive electrode lead 15 and a negative electrode lead 16) connected to the electrode body 14. Each of the electrode leads is led out to the outside from the inside of the outer package 11. In the example shown in FIG. 1, the electrode leads are led out in substantially parallel to each other from the same side of the outer package 11. Each of the electrode leads is a conductive thin plate and, for example, the positive electrode lead 15 is composed of a metal containing aluminum as a main component, and the negative electrode lead 16 is composed of a metal containing copper or nickel as a main component.

Figure 2:
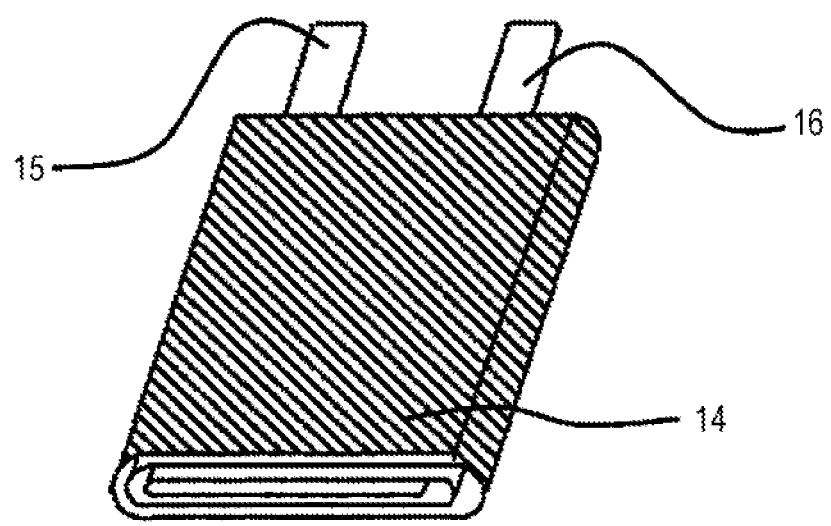
FIG. 2 is a perspective view of an electrode body as an example of an embodiment.
Figure 3:
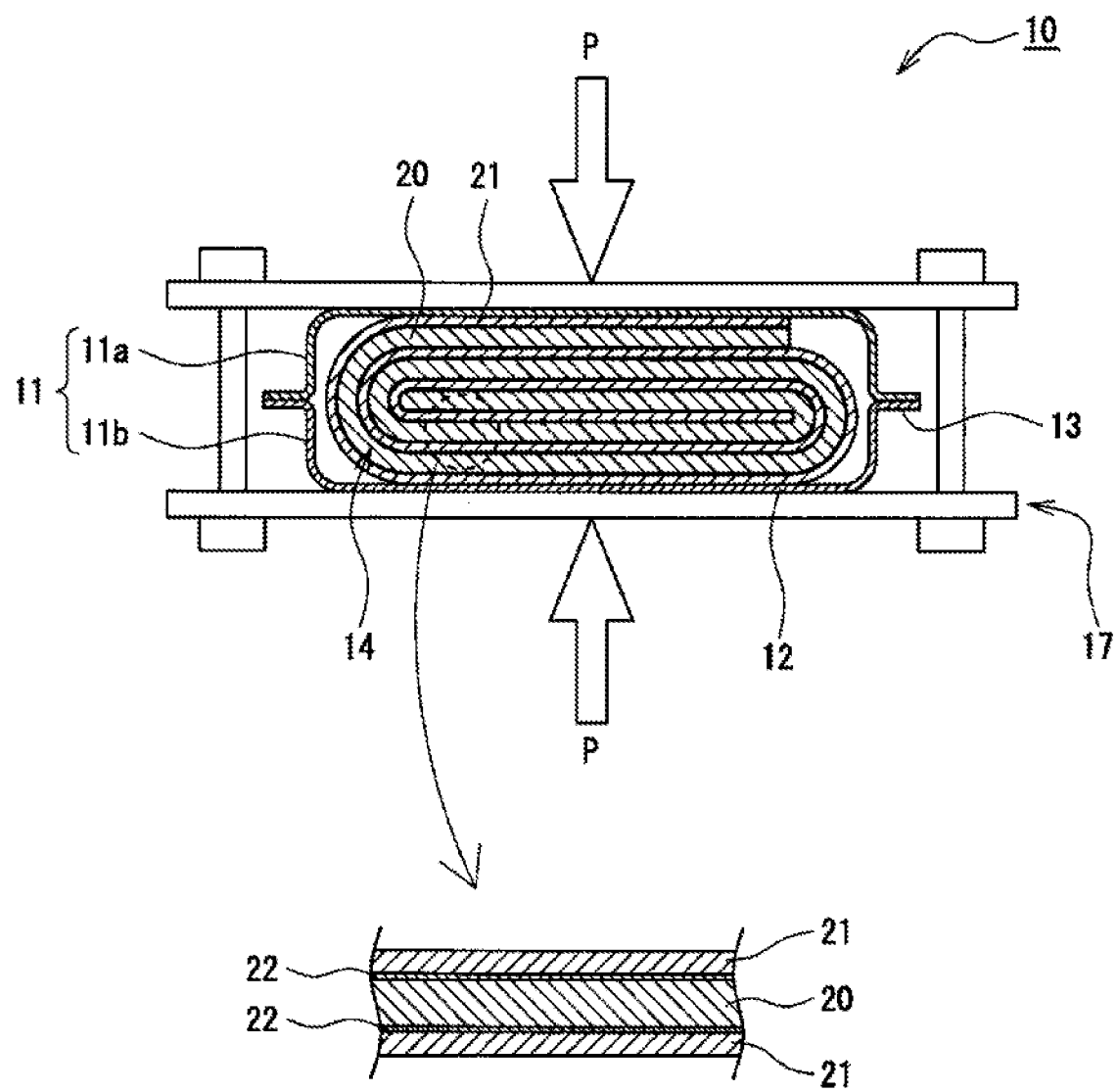
FIG. 3 is a sectional view of a nonaqueous electrolyte secondary battery as an example of an embodiment.

FIG. 2 is a perspective view of the electrode body 14, and FIG. 3 is a sectional view of the nonaqueous electrolyte secondary battery 10. As illustrated in FIG. 2 and FIG. 3, the electrode body 14 has a structure in which a positive electrode 20 and a negative electrode 21 are wound through a separator 22 and compressed into a flat shape. The electrode body 14 is a wound body (cylinder) formed by laminating the negative electrode 21, the separator 22, the positive electrode 20, and the separator 22 in that order from the inner side, and has a flat shape formed by compression crushing of the wound body in a direction. The pressure P acting from the pressing member 17 in the thickness direction of the electrode body 14 is $5\times10^{-2}$ MPa or more.

The thickness direction of the electrode body 14 represents the direction of lamination (direction perpendicular to the axial direction) of the positive electrode 20, the negative electrode 21, and the separator 22 which constitute the electrode body 14, the electrode body 14 having the minimum length along the direction. In other words, the direction of compression of the wound body is the thickness direction of the electrode body 14. The thickness $D_{14}$ of the electrode body 14 is not particularly limited but is, for example, 2 to 40 mm.

FIG. 2 illustrates the wound electrode body 14, but the electrode body may be a laminated type in which a plurality of positive electrodes and a plurality of negative electrodes are alternately laminated through separators. In the case of the laminated-type electrode body, the direction of lamination of the positive electrodes, the negative electrodes, and the separators is the thickness direction of the electrode body.

The positive electrode 20 contains, as a positive electrode active material, a lithium transition metal oxide containing tungsten oxide adhering to the particle surfaces thereof. The negative electrode 21 contains a negative electrode active material, which has particle surfaces having amorphous carbon, and at least one of polyacrylic acid and a salt thereof. In the specification of the present invention, polyacrylic acid and a salt thereof are generically named "PAA". The PAA represents at least one (that is, both or either) of polyacrylic acid and a salt thereof unless otherwise specified. The PAA has the function of bonding the negative electrode active material particles to each other and bonding the negative electrode active material particles to a negative electrode current collector. The tungsten oxide adhering to the particle surfaces of lithium transition metal oxide, the amorphous carbon, and PAA are essential components for improving the low-temperature regeneration of the battery.

The nonaqueous electrolyte secondary battery 10 has a configuration in which the pressure P of $5\times10^{-2}$ MPa or more acts in the thickness direction of the electrode body 14. In the embodiment, the pressure P is applied to the electrode body 14 from the outside of the outer package 11 by using the pressing member 17 which holds each housing part 12 of the outer package 11 and presses from the front and back sides thereof. The pressure P may be $5\times10^{-2}$ MPa or more, but is preferably $7\times10^{-2}$ MPa or more and more preferably $8\times10^{-2}$ MPa or more. With the pressure P of $5\times10^{-2}$ MPa or more, adhesion between the amorphous carbon and PAA can be sufficiently secured. In view of pressure resistance of the battery case, the upper limit of the pressure P is preferably 10 MPa or less. The pressure P is generally referred to as "constituent pressure" and acts substantially perpendicularly to the surface of the electrode body 14.

Each of the components, particularly the positive electrode 20 and the negative electrode 21, of the nonaqueous electrolyte secondary battery 10 is described in detail below.

[Positive Electrode]

The positive electrode 20 includes a positive electrode current collector such as, for example, a metal foil or the like, and a positive electrode active material layer formed on the positive electrode current collector. A foil of a metal such as aluminum or the like, which is stable within the potential range of the positive electrode 20, a film having the metal disposed in a surface layer, or the like can be used as the positive electrode current collector. The positive electrode mixture layer contains the positive electrode active material, a conductive material, and a binder. The positive electrode 20 can be produced by, for example, applying a positive electrode mixture slurry containing secondary particles of the positive electrode active material, the conductive material, and the binder on the positive electrode current collector, drying the coating film, and ten rolling the coating film to form positive electrode mixture layers on both surfaces of the current collector.

Examples of the conductive material include carbon materials such as carbon black, acetylene black, ketjen black, graphite, and the like. These may be used alone or in combination of two or more.

Examples of the binder include fluorocarbon resins such as polytetrafluoroethylene (PTFE), polyvinylidene fluoride (PVdF), and the like; polyacrylonitrile (PAN), polyimide, acryl resins, polyolefin, and the like. Any one of these resins may be used in combination with carboxymethyl cellulose (CMC) or a salt thereof, polyethylene oxide (PEO), or the like. These may be used alone or in combination of two or more.

A lithium transition metal oxide containing tungsten oxide adhering to the particle surfaces thereof is applied to the positive electrode active material. The lithium transition metal oxide includes secondary particles formed by aggregation of primary particles of the lithium transition metal oxide. The tungsten oxide adheres to the surfaces of the secondary particles. The average particle diameter of the lithium transition metal oxide particles is, for example, 2 μm to 30 μm or 5 μm to 20 μm. The average particle diameter represents the median diameter (volume basis) measured by a laser diffraction method and can be measured by using a laser diffraction/scattering particle size distribution analyzer manufactured by Horiba Ltd. (the same applies to the negative electrode active material).

The metal element constituting the lithium transition metal oxide is, for example, at least one selected from magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb), and bismuth (Bi). In particular, at least one selected from Co, Ni, Mn, and Al is preferably contained.

The lithium transition metal oxide preferably contains at least one of W and Zr. W and Zr contribute to improvement in low-temperature regeneration of the battery. The content of each of W and Zr in the lithium transition metal oxide is preferably 0.05 to 2 mol % and more preferably 0.1 to 1 mol % relative to the total molar amount of metal elements excluding Li contained in the oxide. With the content of each of W and Zr within the range, the low-temperature regeneration of the battery is efficiently improved.

The lithium transition metal oxide preferably contains at least one of W and Zr dissolved as a solid solution. The expression "W and Zr dissolved as a solid solution in the lithium transition metal oxide" represents the state (state of being present in crystals) where W and Zr are present by partially substituting the metal elements such as Ni, Co, Mn, etc. in the metal oxide. The state and amount of W and Zr dissolved as a solid solution in the lithium transition metal oxide can be confirmed by Auger electron spectrometry (AES), secondary ion mass spectrometry (SIMS), transmission electron microscope (TEM)-energy dispersive X-ray spectrometry (EDX), or the like of the inside of particles obtained by cutting the particles or shaving the particle surfaces.

As described above, tungsten oxide adheres to the particle surfaces of the lithium transition metal oxide. Tungsten oxide is an essential component for improving the low-temperature regeneration of the battery. If tungsten oxide is contained in the positive electrode mixture layer, that is, it is present near the lithium transition metal oxide, the effect described above can be expected, but tungsten oxide is preferably present in the state of adhering to the particle surfaces of the lithium transition metal oxide. In addition, tungsten oxide may be partially desorbed from the particle surfaces and present in the positive electrode mixture layer.

The amount of tungsten oxide adhering to the particle surfaces of the lithium transition metal oxide is preferably 0.05 to 2 mol % and more preferably 0.1 to 1 mol % relative to the total molar amount of the metal elements, excluding Li, of the lithium transition metal oxide. Examples of tungsten oxide include $WO_3$, $WO_2$, and $W_2O_3$. Among these, hexavalent $WO_3$ with the most stable oxidation number of W is particularly preferred.

Tungsten oxide is preferably evenly scattered on the particle surfaces of the lithium transition metal oxide, without being localized in a portion thereof. The average particle diameter of tungsten oxide is preferably smaller than the average particle diameter of the lithium transition metal oxide and is particularly preferably smaller than ¼ of the latter. The average particle diameter of tungsten oxide in the state of adhering to the particle surfaces of the lithium transition metal oxide can be measured by using a scattering electron microscope (SEM). Specifically, 100 particles of tungsten oxide are randomly selected from a SEM image of the lithium transition metal oxide containing tungsten oxide adhering to the particle surfaces thereof, the maximum diameter of each of the particles is measured, and the measured values are averaged to determine the average particle diameter. The average particle diameter of tungsten oxide particles measured by this method is, for example, 100 nm to 5 μm and is preferably 100 nm to 1 μm.

An example of a method for adhering tungsten oxide particles to the particle surfaces of the lithium transition metal oxide is a method of mechanically mixing lithium transition metal oxide and tungsten oxide (the same applies to a phosphoric acid compound described later). Alternatively, tungsten oxide can be adhered to the particle surfaces of lithium transition metal oxide by adding tungsten oxide to a slurry raw material in the step of preparing the positive electrode mixture slurry.

A phosphoric acid compound may further adhere to the particle surfaces of the lithium transition metal oxide. The phosphoric acid compound contributes to improvement in the low-temperature regeneration of the battery. Usable examples of the phosphoric acid compound include lithium phosphate, lithium dihydrogen phosphate, cobalt phosphate, nickel phosphate, manganese phosphate, potassium phosphate, calcium phosphate, sodium phosphate, magnesium phosphate, ammonium phosphate, ammonium dihydrogen phosphate, and the like. These may be used alone or in combination of two or more.

From the viewpoint of stability during overcharge and the like, a preferred example of the phosphoric acid compound is lithium phosphate. For example, lithium dihydrogen phosphate, lithium hydrogen phosphite, lithium monofluorophosphate, lithium difluorophosphate, or the like may be used as lithium phosphate, but trilithium phosphate ($Li_3PO_4$) is preferred. The lithium phosphate includes particles having a median diameter (D50) of, for example, 50 nm to 10 μm and preferably 100 nm to 1 μm, measured by a laser diffraction method.

The amount of the phosphoric acid compound adhering to the particle surfaces of lithium transition metal oxide is preferably 0.1% to 10% by mass and more preferably 1% to 7% by mass relative to the mass of the lithium transition metal oxide. The phosphoric acid compound may be contained in the positive electrode mixture layer but is preferably present in the state of adhering to the particle surfaces of the lithium transition metal oxide. The phosphoric acid compound may be partially desorbed from the particles surfaces and present in the positive electrode mixture layer. The phosphoric acid compound is preferably evenly scattered on the particle surfaces of the lithium transition metal oxide without being localized in a portion thereof.

[Negative Electrode]

The negative electrode 21 includes a negative electrode current collector composed of, for example, a metal foil or the like, and a negative electrode mixture layer formed on the current collector. A foil of a metal such as copper or the like, which is stable within the potential range of the negative electrode 21, a film having the metal disposed in a surface layer, or the like can be used as the negative electrode current collector. The negative electrode mixture layer contains the negative electrode active material and a binder. The negative electrode 21 can be produced by, for example, applying a negative electrode mixture slurry containing the negative electrode active material, the binder, etc. on the negative electrode current collector, drying the coating film, and then rolling the coating film to form negative electrode mixture layers on both surfaces of the current collector.

The negative electrode active material contains amorphous carbon. Besides the amorphous carbon, the negative electrode active material preferably contains a material which can reversibly absorb and release lithium ions. Usable examples thereof include carbon materials such as natural graphite, synthetic graphite, and the like; metals which alloy with lithium, such as silicon (Si), tin (Sn), and the like; alloys and composite oxides containing a metal element such as Si, Sn, or the like. A preferred material is graphite.

The negative electrode active material contains the amorphous carbon as an amorphous carbon film which coats another negative electrode material and/or as amorphous carbon particles (single particles). The other negative electrode material is preferably a material which can reversibly absorb and release lithium ions, and examples thereof include the materials described above. A preferred material is graphite.

The negative electrode active material preferably contains graphite and amorphous carbon particles. The amorphous carbon particles have particle surfaces which are all composed of amorphous carbon, and thus a W-containing film with low resistance, which is compounded with PAA, is easily formed.

The negative electrode active material preferably contains graphite, which has an amorphous carbon film, and the amorphous carbon particles.

The ratio of PAA coverage on the graphite to the PAA graphite on the amorphous carbon particles is, preferably 0.8 or more and more preferably 1.2 or more and 2 or less. With the ratio of less than 0.8, the ratio of the film compounded with PAA on the amorphous carbon particles is decreased, and thus the effect of improving low-temperature regeneration may become limited. With the ratio larger than 2, the film on the amorphous carbon articles may become excessively thick, and thus the resistance may be increased.

The total amount of the amorphous carbon is preferably 0.5% to 30% by mass, more preferably 1% to 25 & by mass, and particularly preferably 5% to 20% by mass relative to the mass of the negative electrode active material.

The PAA is preferably more arranged on the negative electrode current collector side in the negative electrode mixture layer. When the negative electrode mixture layer is divided into half regions in the direction perpendicular to the surface of the negative electrode current collector, the mass ratio of PAA contained in the region on the side far from the negative electrode current collector is, for example, 0.4 or less and more preferably 0.1 or less relative to the mass of PAA contained in the negative electrode mixture.

The ratio of the amorphous carbon film to the graphite is 0.1% to 20% by mass, preferably 0.5% to 15% by mass, and more preferably 1% to 10% by mass.

The ratio of the graphite having the amorphous carbon film to the total amount of the negative electrode active material is 90% to 99.9% by mass, preferably 93% to 99.5% by mass, and more preferably 95% to 99% by mass. The ratio of the amorphous carbon particles to the total amount of the negative electrode active material is 0.1% to 20% by mass, preferably 0.5% to 15% by mass, and more preferably 1% to 10% by mass.

The amorphous carbon is a carbon material having an amorphous or microcrystaline turbostratic structural state in which a graphite crystal structure is not developed or a carbon material having a very fine particle diameter, but not having a spherical or flake-like shape. For example, a carbon material having a spacing d(002) more than 0.340 nm in X-ray diffraction is amorphous carbon. Also, a carbon material containing primary particles having an average particle diameter of 1 μm or less measured by observation with a scattering electron microscope (SEM) is amorphous carbon. Examples of amorphous carbon include carbon black such as hard carbon (hardly graphitizable carbon), soft carbon (easily graphitizable carbon), acetylene black, Ketjen black, thermal black, furnace black, and the like, carbon fibers, activated carbon, and the like.

The amorphous carbon film is, for example, formed over the entire surface of each of the negative electrode active material particles. The thickness of the amorphous carbon film is, for example, 10 to 200 nm and is substantially uniform over the entire particle surface. Examples of a method for forming the amorphous carbon film include a method of heat-treatment (800° C. to 1100° C.) of a mixture of the negative electrode active material particles with coal tar, tar pitch, naphthalene, anthracene, phenanthrene, or the like, a chemical vapor deposition method (CVD method) using hydrocarbon gas or the like, and the like.

The primary particle diameter of the amorphous carbon particles is preferably 20 nm or more and 1000 nm or less and more preferably 40 nm or more and 100 nm or less. The primary particles of the amorphous carbon material is preferably not of a hollow structure in which cavities are present in the particles. An example of a method for producing the amorphous carbon particles is a method of carbonizing a phenol-based thermosetting resin, a thermoplastic resin such as polyacrylonitrile or the like, petroleum- or coal-based tar, pitch, or the like. The specific surface area of the amorphous carbon particles is preferably 5 $m^2/g$ or more and 200 $m^2/g$ or less.

At least one of polyacrylic acid and a salt thereof is used as the binder. PAA is an essential component for improving the low-temperature regeneration of the battery and adheres to the particle surfaces of the negative electrode active material and the surface of the negative electrode current collector, thereby securing the strength of the negative electrode mixture layer. The molecular weight (Mw) of PAA is, for example, 500,000 to 5,000,000. Examples of a polyacrylic acid salt include polyacrylic acid alkyl metal salts, alkyl earth metal salts, and ammonium salts, polyacrylamide, polyacrylate esters, polymethacrylate esters, and copolymers thereof. The polyacrylic acid salt may be a partially neutralized salt. By using the polyacrylic acid salt containing an alkali metal, particularly Na or Li, a low-resistance W-containing film compounded with the polyacrylic acid salt is easily formed. Besides PAA, the negative electrode mixture layer may contain CMC, styrene-butadiene rubber (SBR), polyvinyl alcohol (PVA), or the like. For example, PAA is used in combination with at least one of CMC and SBR.

The content of PAA in the negative electrode mixture layer is, for example, 0.01% to 3% by mass, preferably 0.05% to 2% by mass, and more preferably 0.1% to 1% by mass relative to the mass of the negative electrode mixture layer. When CMC or SBR is combined, the content thereof may be equal to or lower than the content of PAA.

[Separator]

A porous sheet having ion permeability and insulation can be used as the separator 22. Examples of the porous sheet include a microporous thin film, a woven fabric, a nonwoven fabric, and the like. The separator 22 is composed of, for example, polyolefin such as polyethylene, polypropylene, or the like, cellulose, or the like. The separator 22 may be a laminate having a cellulose fiber layer and a thermoplastic resin fiber layer of polyolefin or the like. Further, the separator 22 may be a multilayer separator including a polyethylene layer and a polypropylene layer and may have a surface layer composed of an aramid resin or a surface layer containing an inorganic filler.

[Nonaqueous Electrolyte]

The nonaqueous electrolyte contains a nonaqueous solvent and a solute (electrolyte salt) dissolved in the nonaqueous solvent. Usable examples of the nonaqueous solvent include esters, ethers, nitriles, amides such as dimethyl formamide and the like, isocyanates such as hexamethylene diisocyanate and the like, a mixed solvent of two or more of these solvents, and the like. The nonaqueous solvent may contain a halogen-substituted compound produced by at least partially substituting the hydrogen atoms of the solvent with halogen atoms such as fluorine or the like.

Examples of the esters include cyclic carbonate esters such as ethylene carbonate (EC), propylene carbonate (PC), butylene carbonate, and the like; linear carbonate esters such as dimethyl carbonate (DMC), methyl ethyl carbonate (EMC), diethyl carbonate (DEC), methyl propyl carbonate, ethyl propyl carbonate, methyl isopropyl carbonate, and the like; cyclic carboxylate esters such as γ-butyrolactone, γ-valerolactone, and the like; linear carboxylate esters such as methyl acetate, ethyl acetate, propyl acetate, methyl propionate (MP), ethyl propionate, and the like; and the like.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, crown ethers, and the like; linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like; and the like.

Examples of the nitriles include acetonitrile, propionitrile, butyronitrile, valeronitrile, n-heptanitrile, succinonitrile, glutaronitrile, adiponitrile, pimelonitrile, 1,2,3-propanetricarbonitrile, 1,3,5-pentanetricarbonitrile, and the like.

Examples of the electrolyte salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lithium lower aliphatic carboxylates, $Li_2B_4O_7$, boric acid salts such as Li $(B(C_2O_4)F_2)$ and the like, $LiN(SO_2CF_3)_2$, imide salts such as $LiN(C_lF_{2l+1}SO_2)(C_mF_{2m+1}SO_2)$ {l and m are each an integer of 1 or more} and the like, and the like. These electrolyte salts may be used alone or in a mixture of a plurality of types. The concentration of the electrolyte salt is, for example, 0.8 to 1.8 moles per L of the nonaqueous solvent.

The nonaqueous electrolyte may further contain lithium difluorophosphate ($LiPO_2F_2$). The addition of $LiPO_2F_2$ to the nonaqueous electrolyte contributes to improvement in the low-temperature regeneration of the battery. The content of $LiPO_2F_2$ is, for example, 0.01 to 0.1 moles per L of the nonaqueous solvent containing the electrolyte salt. Also, vinylene carbonate (VC) or $LiBOB:Li(B(C_2O_4)_2)$ may be added to the nonaqueous electrolyte.

EXPERIMENT EXAMPLES

The present disclosure is further described below by giving experiment examples, but the present disclosure is not limited to these experiment examples.

Experiment Example 1

[Formation of Positive Electrode Active Material]

A nickel-cobalt-manganese composite hydroxide produced by mixing and coprecipitating $NiSO_4$, $CoSO_4$, and $MnSO_4$ in a water solution was fired to produce a nickel-cobalt-manganese composite oxide. Next, the composite oxide, lithium carbonate, tungsten oxide ($WO_3$), and zirconium oxide ($ZrO_2$) were mixed by using a grinding mortar. The mixing ratio (molar ratio) of lithium, nickel cobalt manganese, tungsten, and zirconium was 1.15:1.0:0.005:0.005. The mixture was fired in air at 900° C. for 10 hours and then ground to produce a lithium transition metal oxide containing W and Zr. As a result of elemental analysis of the resultant lithium transition metal oxide by ICP emission spectrometry, the molar ratio of Ni, Co, Mn, W, and Zr was 46.7:26.7:25.6:0.5:0.5.

Next, the resultant lithium transition metal oxide was mixed with $WO_3$ at 0.5 mol % in terms of W element relative to the total amount of metal elements (transition metals) excluding Li in the oxide and with lithium phosphate ($Li_3PO_4$) at 5% by mass relative to the total amount of the oxide, producing a lithium transition metal oxide (positive electrode active material) containing $WO_3$ and $Li_3PO_4$ adhering to the particle surfaces thereof.

[Formation of Positive Electrode]

The positive electrode active material was mixed with carbon powder and polyvinylidene fluoride (PVDF) at a mass ratio of 91:7:2. Then, N-methyl-2-pyrrolidone (NMP) was added as a dispersion medium to the resultant mixture and kneaded to prepare a positive electrode mixture slurry. Next, the positive electrode mixture slurry was applied to an aluminum foil serving as a positive electrode current collector, and the coating film was dried and rolled to form positive electrode mixture layers formed on both surfaces of the aluminum foil. The positive electrode current collector having the positive electrode mixture layers formed as described above was cut into a predetermined size to form a positive electrode. An aluminum-made positive electrode lead was attached to the positive electrode.

As a result of SEM observation of the positive electrode formed as described above, it was confirmed that tungsten oxide particles having an average particle diameter of 150 nm and lithium phosphate particles having an average particle diameter of 100 nm adhere to the particle surfaces of the lithium transition metal oxide. However, tungsten oxide and lithium phosphate may be partially separated from the particle surfaces in the step of mixing the conductive material and the binder and present in the positive electrode mixture layer. Also, it was confirmed by SEM observation that lithium phosphate either adheres to tungsten oxide or is present near tungsten oxide.

[Formation of Negative Electrode]

Graphite powder having surfaces coated with amorphous carbon (the coating amount of amorphous carbon of 9.5% by mass % relative to graphite) was mixed with amorphous carbon particles at a mass ratio of 93:7 to form a negative electrode active material. The negative electrode active material, carboxylmethyl cellulose sodium (CMC-Na), lithium polyacrylate (PAA-Li), and styrene-butadiene rubber (SBR) were simultaneously mixed at a mass ratio of 98.8:0.5:0.5:0.2. Then, water was added to the resultant mixture and stirred by using a mixer (T. K. Hivismix manufactured by Primix Corporation) to prepare a negative electrode mixture slurry. Next, the negative electrode mixture slurry was applied to a copper foil serving as a negative electrode current collector, and the coating film was dried and rolled to form negative electrode mixture layers on both surfaces of the copper foil. The negative electrode current collector having the negative electrode mixture layers formed as described above was cut into a predetermined size to form a negative electrode. A nickel-made negative electrode lead was attached to the negative electrode.

[Preparation of Nonaqueous Electrolyte]

Ethylene carbonate (EC), methyl ethyl carbonate (MEC), and dimethyl carbonate (DMC) were mixed at a volume ratio of 30:30:40. Then, $LiPF_6$ was dissolved in the resultant mixed solvent so that the concentration was 1.2 mol/L. Further, vinylene carbonate at a concentration of 0.3% by mass and LiBOB:($Li(B(C_2O_4)_2)$) and lithium difluorophosphate ($LiPO_2F_2$) at a concentration of 0.05 mol/L were dissolved in the resultant mixed solvent containing $LiPF_6$, thereby preparing a nonaqueous electrolyte.

[Formation of Battery]

An electrode body having a flat-shape wound structure was formed by using the positive electrode, the negative electrode, and two separators composed of a polyethylene microporous film. First, the positive electrode and the negative electrode were opposed to each other in an insulating state with the separators disposed therebetween and wound in a spiral form around a cylindrical winding core so that both the positive electrode lead and the negative electrode lead were disposed on the outermost peripheral side of a wound body. Then, the winding core was pulled out to form the wound body. The wound body was crushed by compressing in a direction to form an electrode body having a flat-shape wound structure.

The electrode body and the nonaqueous electrolyte were introduced and sealed in an outer package composed of an aluminum laminate film in a glo box in an argon atmosphere. Next, a pressure (constituent pressure) of 0.09 MPa was applied in the thickness direction of the electrode body by using a pressing member (pressing jig), thereby producing a laminated-type nonaqueous electrolyte secondary battery (battery 1). A portion of the battery 1 excluding the pressing member has the dimensions of 3.6 mm in thickness, 3.5 cm in width, and 6.2 cm in length.

Experiment Example 2

A nonaqueous electrolyte secondary battery (battery 2) was formed by the same method as in Experiment Example 1 except that the constituent pressure was 0.13 MPa.

Experiment Example 3

A nonaqueous electrolyte secondary battery (battery 3) was formed by the same method as in Experiment Example 1 except that the constituent pressure was 0.22 MPa.

Experiment Example 4

A nonaqueous electrolyte secondary battery (battery 4) was formed by the same method as in Experiment Example 1 except that first, amorphous carbon particles were mixed with PAA-Li, and then graphite powder having surfaces coated with amorphous carbon was mixed with CMC-Na.

Experiment Example 5

A nonaqueous electrolyte secondary battery (battery 5) was formed by the same method as in Experiment Example 1 except that in forming a negative electrode, a negative electrode mixture slurry 1 containing the negative electrode active material, carboxylmethyl cellulose sodium (CMC-Na), lithium polyacrylate (PAA-Li), and styrene-butadiene rubber (SBR) at a ratio of 97.5:0.5:1.8:0.2 was applied to a copper foil, and then a negative electrode mixture slurry 2 containing the negative electrode active material, carboxylmethyl cellulose sodium (CMC-Na), lithium polyacrylate (PAA-Li), and styrene-butadiene rubber (SBR) at a ratio of 99.1:0.5:0.2:0.2 was applied to the copper foil. In addition, the thickness of the negative electrode mixture layer was the same as in Experiment Example 1, and the negative electrode mixture slurry 1 and the negative electrode mixture slurry 2 were applied in the same thickness. When the negative electrode mixture layer was divided into half regions in the direction perpendicular to the surface of the negative electrode current collector, the mass ratio (B) of PAA contained in the region on the side far from the negative electrode current collector was 0.1 relative to the mass of PAA contained in the negative electrode mixture.

Experiment Example 6

A nonaqueous electrolyte secondary battery (battery 6) was formed by the same method as in Experiment Example 1 except that in preparing a negative electrode mixture slurry, the negative electrode active material, CMC-Na, and SBR were mixed at a mass ratio of 99.3:0.5:0.2 without PAA-Li added, and a constituent pressure was not applied (constituent pressure of 0).

Experiment Example 7

A nonaqueous electrolyte secondary battery (battery 7) was formed by the same method as in Experiment Example 1 except that in preparing the negative electrode mixture slurry, the negative electrode active material, CMC-Na, and SBR were mixed at a mass ratio of 99.3:0.5:0.2 without PAA-Li added.

Experiment Example 8

A nonaqueous electrolyte secondary battery (battery 8) was formed by the same method as in Experiment Example 1 except that the constituent pressure was zero.

Experiment Example 9

A nonaqueous electrolyte secondary battery (battery 9) was formed by the same method as in Experiment Example 1 except that in preparing a negative electrode mixture slurry, the negative electrode active material, CMC-Na, and SBR were mixed at a mass ratio of 98.8:1.0:0.2 without PAA-Li added, and the constituent pressure was zero.

Experiment Example 10

A nonaqueous electrolyte secondary battery (battery 10) was formed by the same method as in Experiment Example 1 except that in preparing a negative electrode mixture slurry, the negative electrode active material, CMC-Na, PAA-Li, and SBR were mixed at a mass ratio of 98.3:1.0:0.5:0.2, and the constituent pressure was zero.

Experiment Example 11

A nonaqueous electrolyte secondary battery (battery 11) was formed by the same method as in Experiment Example 1 except that in preparing a negative electrode mixture slurry, the negative electrode active material, CMC-Na, and SBR were mixed at a mass ratio of 98.8:1.0:0.2 without PAA-Li added.

Experiment Example 12

A nonaqueous electrolyte secondary battery (battery 12) was formed by the same method as in Experiment Example 1 except that in preparing a negative electrode mixture slurry, the negative electrode active material, CMC-Na, and SBR were mixed at a mass ratio of 98.8:1.0:0.2 without PAA-Li added, and the constituent pressure was 0.13 MPa.

Experiment Example 13

A nonaqueous electrolyte secondary battery (battery 13) was formed by the same method as in Experiment Example 1 except that in preparing a negative electrode mixture slurry, the negative electrode active material, CMC-Na, and SBR were mixed at a mass ratio of 98.8:1.0:0.2 without PAA-Li added, and the constituent pressure was 0.22 MPa.

Experiment Example 14

A nonaqueous electrolyte secondary battery (battery 14) was formed by the same method as in Experiment Example 1 except that $WO_3$ was not adhered to the particle surfaces of a lithium transition metal oxide.

Experiment Example 15

A nonaqueous electrolyte secondary battery (battery 15) was formed by the same method as in Experiment Example 1 except that in preparing a negative electrode mixture slurry, the negative electrode active material, CMC-Na, and SBR were mixed at a mass ratio of 99.3:0.5:0.2 without PAA-Li added, and $WO_3$ was not adhered to the particle surfaces of a lithium transition metal oxide.

Experiment Example 16

A nonaqueous electrolyte secondary battery (battery 16) was formed by the same method as in Experiment Example 1 except that the surfaces of graphite powder were not coated with amorphous carbon, and amorphous carbon particles were not mixed.

Experiment Example 17

A nonaqueous electrolyte secondary battery (battery 17) was formed by the same method as in Experiment Example 1 except that the surfaces of graphite powder were not coated with amorphous carbon, amorphous carbon particles were not mixed, and $WO_3$ was not adhered to the particle surfaces of a lithium transition metal oxide.

Experiment Example 18

A nonaqueous electrolyte secondary battery (battery 18) was formed by the same method as in Experiment Example 1 except that in preparing a negative electrode mixture slurry, PAA-Li was not added, the surfaces of graphite powder were not coated with amorphous carbon, and the negative electrode active material not mixed with amorphous carbon particles, CMC-Na, and SBR were mixed at a mass ratio of 99.3:0.5:0.2.

[Measurement of PAA Coverage on Carbon Material]

The area of the PAA-coated surfaces of the amorphous carbon particles and the surface area of the amorphous carbon particles were measured by IR measurement, XPS, and staining and then SEM/EDX observation of the negative electrode used for forming each test cell, and the PAA coverage on the amorphous carbon material was measured. At the same time, the PAA coverage on graphite particles having the amorphous carbon film was measured. The PAA coverage ratio (A) of each test cell was calculated by diving the PAA coverage on the amorphous carbon particles by the PAA coverage on the graphite particles having an amorphous carbon film.

[Output Characteristic Test]

Each of the batteries 1 to 18 was charged at a constant current under a temperature condition of 25° C. until the battery voltage was 4.1 V at a current value of 600 mA, and then charged at a constant voltage until the current value was 0.1 mA at 4.1 V. Then, constant-current discharge was performed until the battery voltage was 2.5 V at 600 mA. The discharge capacity at the constant-current discharge was regarded as the rated capacity of each of the batteries.

Next, constant-current discharge was performed at a battery temperature of 25° C. until the battery voltage was 2.5 V at 800 mA, and charging was again performed to 50% of the rated capacity. Then, the low-temperature regeneration value at a state of charge (SOC) of 50% of each of the batteries was determined by a formula below from the maximum current value at which when the charge termination voltage at a battery temperature of −30° C. was 4.3 V, charging can be performed for 10 seconds.

Low-temperature regeneration value (SOC 50%)=measured maximum current value x charge termination voltage (4.3 V)

Based on the regeneration characteristic result (100%) of the battery 4, the ratios of the low-temperature regeneration values of the other batteries were calculated. The results are shown in Table 1.

TABLE 1

| | Positive electrode $WO_3$ mol % (relative to transition metal) | Negative electrode active material | | CMC-Na % by mass (relative to negative electrode mixture) | PAA-Li % by mass (relative to negative electrode mixture) | PAA coverage ratio (A) % | PAA mass ratio (B) Mass ratio | Constituent pressure MPa | Low-temperature regeneration % |
|---|---|---|---|---|---|---|---|---|---|
| | | Amorphous carbon film % by mass (relative to graphite) | Amorphous carbon particle % by mass (relative to negative electrode active material) | | | | | | |
| Battery 1 | 0.5 | 9.5 | 7 | 0.5 | 0.5 | 0.8 | 0.5 | $9 \times 10^{-2}$ | 110 |
| Battery 2 | 0.5 | 9.5 | 7 | 0.5 | 0.5 | 0.8 | 0.5 | $13 \times 10^{-2}$ | 113 |
| Battery 3 | 0.5 | 9.5 | 7 | 0.5 | 0.5 | 0.8 | 0.5 | $22 \times 10^{-2}$ | 113 |
| Battery 4 | 0.5 | 9.5 | 7 | 0.5 | 0.5 (Previous mixing) | 1.3 | 0.5 | $9 \times 10^{-2}$ | 120 |
| Battery 5 | 0.5 | 9.5 | 7 | 0.5 | 0.5 | 0.8 | 0.1 | $9 \times 10^{-2}$ | 120 |
| Battery 6 | 0.5 | 9.5 | 7 | 0.5 | — | — | — | 0 | 100 |
| Battery 7 | 0.5 | 9.5 | 7 | 0.5 | — | — | — | $9 \times 10^{-2}$ | 94 |
| Battery 8 | 0.5 | 9.5 | 7 | 0.5 | 0.5 | 0.8 | 0.5 | 0 | 91 |
| Battery 9 | 0.5 | 9.5 | 7 | 1 | — | — | — | 0 | 93 |
| Battery 10 | 0.5 | 9.5 | 7 | 1 | 0.5 | 0.8 | 0.5 | 0 | 90 |
| Battery 11 | 0.5 | 9.5 | 7 | 1 | — | — | — | $9 \times 10^{-2}$ | 94 |
| Battery 12 | 0.5 | 9.5 | 7 | 1 | — | — | — | $13 \times 10^{-2}$ | 95 |
| Battery 13 | 0.5 | 9.5 | 7 | 1 | — | — | — | $22 \times 10^{-2}$ | 95 |
| Battery 14 | — | 9.5 | 7 | 0.5 | 0.5 | 0.8 | 0.5 | $9 \times 10^{-2}$ | 86 |
| Battery 15 | — | 9.5 | 7 | 0.5 | — | — | — | $9 \times 10^{-2}$ | 99 |
| Battery 16 | 0.5 | — | — | 0.5 | 0.5 | 0.8 | 0.5 | $9 \times 10^{-2}$ | 100 |
| Battery 17 | — | — | — | 0.5 | 0.5 | 0.8 | 0.5 | $9 \times 10^{-2}$ | 98 |
| Battery 18 | 0.5 | — | — | 0.5 | — | — | — | $9 \times 10^{-2}$ | 98 |

Table 1 indicates that the batteries 1 to 5 have excellent low-temperature regeneration characteristics as compared with the batteries 6 to 18. That is, it is found that when the positive electrode containing the lithium transition metal oxide, to which tungsten oxide adheres, and the negative electrode containing amorphous carbon and PAA are provided, and the constituent pressure is $5 \times 10^{-2}$ MPa or more, low-temperature regeneration is specifically improved. This is considered to be due to the fact that functional groups such as hydroxyl groups remaining on the amorphous carbon are bonded to the terminal hydroxyl groups of PAA through W, and thus the low-resistance coating film is formed on the amorphous carbon surface. The results of the batteries 6 to 18 indicate that if there is a lack of any one of these factors, substantially no or completely no effect of improving low-temperature regeneration is achieved. In the battery 4, more PAA is disposed on the amorphous carbon by previously mixing PAA with the amorphous carbon particles. It is considered that the amorphous carbon particles have particle surfaces entirely composed of amorphous carbon, and thus a low-resistance film is more formed in the battery 4.

REFERENCE SIGNS LIST 10 nonaqueous electrolyte secondary battery
11 outer package
11a, 11b laminate film
12 housing part
13 sealing part
14 electrode body
15 positive electrode lead
16 negative electrode lead
17 pressing member
20 positive electrode
21 negative electrode
22 separator

The invention claimed is:

1. A nonaqueous electrolyte secondary battery comprising an electrode body, which is formed by laminating a positive electrode and a negative electrode through a separator, a nonaqueous electrolyte, and an outer package, which houses the electrode body and the nonaqueous electrolyte, wherein the positive electrode contains a lithium transition metal oxide which contains tungsten oxide adhering to particle surfaces thereof;

the negative electrode contains a negative electrode active material, which includes graphite, which has an amorphous carbon film, and amorphous carbon particles and at least one of polyacrylic acid and a salt thereof;

wherein amorphous carbon of the amorphous carbon film and the amorphous carbon particles is present in an amount of 5% by mass to 30% by mass relative to the negative electrode active material; and pressure acting in the thickness direction of the electrode body is $5 \times 10^{-2}$ MPa or more, wherein the pressure is applied in a thickness direction of the electrode body by a member which presses the outer package.

2. The nonaqueous electrolyte secondary battery according to claim 1, wherein a ratio of coverage of at least one of polyacrylic acid and a salt thereof on particle surfaces of the amorphous carbon to a coverage of at least one of polyacrylic acid and a salt thereof on the surfaces of the graphite having the amorphous carbon film is 1.2 or more.

3. The nonaqueous electrolyte secondary battery according to claim 1, wherein the lithium transition metal oxide contains at least one of tungsten (W) and zirconium (Zr).

* * * * *